(12) United States Patent
Watanabe

(10) Patent No.: US 12,711,648 B2
(45) Date of Patent: Aug. 18, 2026

(54) IMAGE PROCESSING APPARATUS, CONTROL METHOD THEREOF, IMAGE CAPTURING APPARATUS, AND STORAGE MEDIUM

(71) Applicant: CANON KABUSHIKI KAISHA, Tokyo (JP)

(72) Inventor: Kentaro Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 18/176,305

(22) Filed: Feb. 28, 2023

(65) Prior Publication Data

US 2023/0281859 A1 Sep. 7, 2023

(30) Foreign Application Priority Data

Mar. 4, 2022 (JP) ................................ 2022-033442

(51) Int. Cl.
*G06T 7/70* (2017.01)
*G06F 3/14* (2006.01)
*G06V 10/25* (2022.01)

(52) U.S. Cl.
CPC .................. *G06T 7/70* (2017.01); *G06F 3/14* (2013.01); *G06V 10/25* (2022.01); *G06V 2201/07* (2022.01)

(58) Field of Classification Search
CPC .. G06T 7/70; G06F 3/14; G06F 3/147; G06V 10/25; G06V 2201/07; G06V 40/16; G06V 40/18; H04N 23/611; H04N 23/635; H04N 23/673; H04N 23/672; H04N 23/675
See application file for complete search history.

(56) References Cited

U.S. PATENT DOCUMENTS 10,511,758 B2 * 12/2019 Hong ..................... G06V 40/10
11,297,221 B2 * 4/2022 Tsuchiya .............. H04N 23/635
2014/0211993 A1 * 7/2014 Ishii ...................... H04N 23/80 382/103
2021/0397850 A1 * 12/2021 Yakuwa ................... F25B 1/00

FOREIGN PATENT DOCUMENTS

JP 2008046654 A * 2/2008
JP 2012015889 A 1/2012
JP 2013160991 A 8/2013
JP 2019120748 A * 7/2019
WO 2020129620 A1 6/2020
WO 2020137602 A1 7/2020

* cited by examiner

*Primary Examiner* — Oneal R Mistry
*Assistant Examiner* — Justin Philip Cascais
(74) *Attorney, Agent, or Firm* — Canon U.S.A., Inc. IP Division

(57) ABSTRACT

An image processing apparatus configured to process a captured image includes a detection unit configured to detect an object from the image and to acquire first and second detection areas, a relevant area setting unit configured to set the first detection area as a relevant area relevant to the second detection area, a search area setting unit configured to set a search area related to the object in the image, and a target setting unit configured to set an arbitrary area in the image as a target area for processing, wherein, in a case where the search area and the second detection area or the relevant area overlap, the target setting unit sets the second detection area as the target area, and wherein the detection unit detects a train as the object and acquires the first and second detection areas.

11 Claims, 10 Drawing Sheets

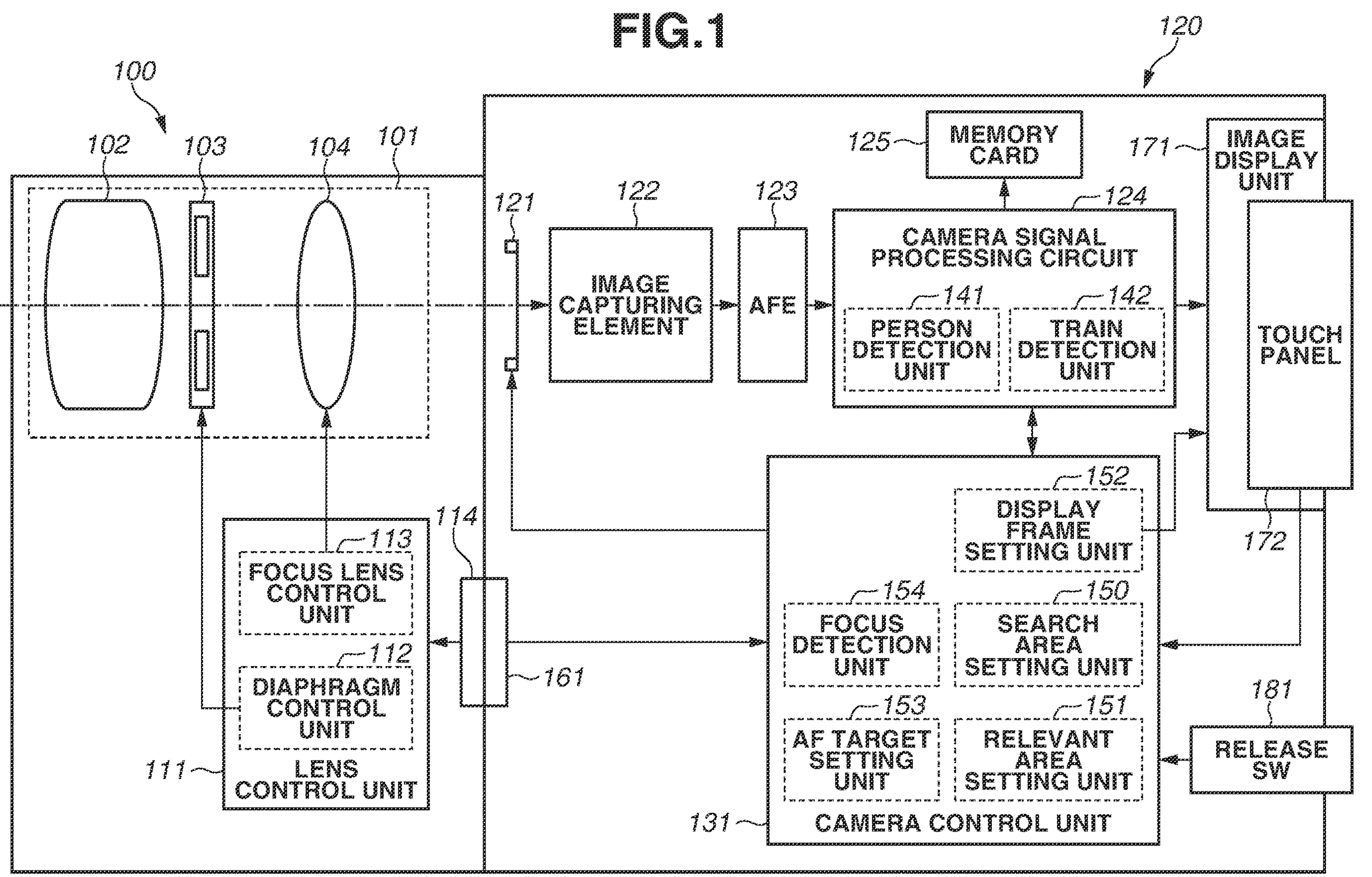
FIG.1
100
101
102
103
104
111
LENS CONTROL UNIT
112
DIAPHRAGM CONTROL UNIT
113
FOCUS LENS CONTROL UNIT
114
120
121
122
IMAGE CAPTURING ELEMENT
123
AFE
124
CAMERA SIGNAL PROCESSING CIRCUIT
141
PERSON DETECTION UNIT
142
TRAIN DETECTION UNIT
125
MEMORY CARD
131
CAMERA CONTROL UNIT
150
SEARCH AREA SETTING UNIT
151
RELEVANT AREA SETTING UNIT
152
DISPLAY FRAME SETTING UNIT
153
AF TARGET SETTING UNIT
154
FOCUS DETECTION UNIT
161
171
IMAGE DISPLAY UNIT
172
TOUCH PANEL
181
RELEASE SW

IMAGE PROCESSING APPARATUS, CONTROL METHOD THEREOF, IMAGE CAPTURING APPARATUS, AND STORAGE MEDIUM

BACKGROUND

Field

The present disclosure relates to a technique for detecting and setting an object based on a captured image.

Description of the Related Art

There is a technique for detecting an object from an image captured by an image capturing element in an image capturing apparatus and focusing on the object by automatic focus (AF) control. Meanwhile, in order to assist a user in focusing on an arbitrary position in an image, there is a technique for displaying a rectangular frame (hereinbelow also referred to as a fixed AF frame) in a part of a captured image, and focusing on the rectangular frame area in response to a user operation instruction. By combining these two techniques, it is possible to display both an object detection frame and the fixed AF frame and determine which one should be focused on based on position information and area information of each frame. A user is notified of the determination result and can improve a concordance rate between a focusing target and a target that the user intended.

Japanese Patent Application Laid-Open No. 2012-15889 discusses a technique for accurately recognizing an object. A touch allowable frame that is wider than an object frame is set based on a state of an image or an image capturing mode, and in a case where a position on the image specified by a user is detected, an object as a tracking target is recognized based on the touch allowable frame and the specified position.

SUMMARY

According to an aspect of the present disclosure, an image processing apparatus configured to process a captured image includes a detection unit configured to detect an object from the image and to acquire first and second detection areas, a relevant area setting unit configured to set the first detection area as a relevant area relevant to the second detection area, a search area setting unit configured to set a search area related to the object in the image, and a target setting unit configured to set an arbitrary area in the image as a target area for processing, wherein, in a case where the search area and the second detection area or the relevant area overlap, the target setting unit sets the second detection area as the target area, and wherein the detection unit detects a train as the object and acquires the first and second detection areas.

Further features of the present disclosure will become apparent from the following description of exemplary embodiments with reference to the attached drawings.

BRIEF DESCRIPTION OF THE DRAWINGS

FIG. 1 illustrates a configuration example of an image capturing apparatus according to an exemplary embodiment of the present disclosure.

DESCRIPTION OF THE EMBODIMENTS

Figure 2:
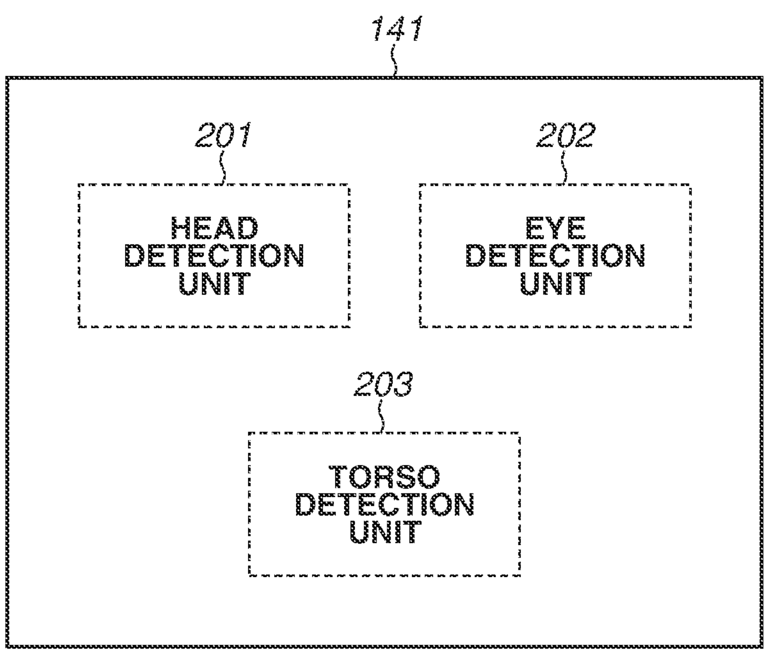
FIG. 2 is a block diagram illustrating a configuration of a person detection unit according to the present exemplary embodiment.

Exemplary embodiments of the present disclosure will be described in detail below with reference to the attached drawings. As an apparatus to which an image processing apparatus is applied, an image capturing apparatus that detects an eye, a head, and a torso of a person or a car and a front end of a train in an image, sets a search area and an automatic focus (AF) target area while setting a relevant area for each detected object, and notifies a user of the AF target area is described as an example.

Depending on an object as a detection target, for example, if a size of the object is small or if the object moves fast, it may be difficult for a user holding an image capturing apparatus to keep capturing an object detection frame within an fixed AF frame. Even if the user intends to set a desired object as an AF target, it may be difficult to select the desired object as the AF target because the user cannot maintain a state in which the object detection frame and the fixed AF frame overlap. Thus, the present disclosure is directed to providing an image processing apparatus that can set a detection area of a desired object to a processing target area.

For example, in processing for determining which of areas corresponding to the object detection frame and the fixed AF frame is set to an AF target area, it is possible to determine whether the object detection frame and the fixed AF frame overlap. In a case where the object detection frame and the fixed AF frame overlap, the object detection frame is set as the AF target area, otherwise the fixed AF frame is set as the AF target area.

Regarding an issue that it is difficult to select the object as the AF target in a case where a size of the object is small or a movement of the object is fast, there is a method for increasing the object detection frame as a measure to make it easier to select the object as the AF target. There is a method for extending a determination range of overlap between the object detection frame and the fixed AF frame. There is, however, no change in the point that the user needs to continue to capture the vicinity of the object for the small-sized object or the fast-moving object. If the object detection frame or the overlap determination range is extended too much, a harmful effect may occur. Extending the range more than necessary may be a factor in preventing a user from setting an area in which the object is not detected as the AF target area. Thus, according to the exemplary embodiment described below, a method for making it easier for a user to set an object as an AF target for the object that is difficult for the user to keep capturing an object detection frame in a fixed AF frame is described.

FIG. 1 illustrates a configuration example of the image capturing apparatus according to the present exemplary embodiment. A configuration example of a mirrorless camera having an eye AF function is illustrated. An interchangeable lens 100 is one of optical apparatuses that can be attached to a main body unit 120 of the image capturing apparatus. An imaging lens unit 101 in the interchangeable lens 100 includes a main imaging optical system 102, a diaphragm 103 for adjusting a light amount, and a focus lens group 104 for adjusting focus.

A microcomputer for controlling a lens system (hereinbelow, referred to as a lens control unit) 111 controls the interchangeable lens 100. A diaphragm control unit 112 controls an operation of the diaphragm 103, and a focus lens control unit 113 controls an operation of the focus lens group 104. For example, the focus lens control unit 113 drives the focus lens group 104 in an optical axis direction of the imaging lens unit 101 based on focus lens driving information acquired from the main body unit 120 and thus controls focus adjustment of the imaging optical system. The focus lens group 104 may include a plurality of focus lenses, or may include only one focus lens. FIG. 1 illustrates a fixed focal length lens as an example of the interchangeable lens for simplification of illustration, but a lens (zoom lens) capable of changing a focal length may be used. In this case, the lens control unit 111 acquires focal length information from an encoder output for detecting a zoom lens position. In a case where an interchangeable lens has a camera-shake correction function, the lens control unit 111 controls a shift lens group for image stabilization.

The main body unit 120 includes a shutter 121 used for exposure control and an image capturing element 122 such as a complementary metal oxide semiconductor (CMOS) sensor. An image capturing signal output from the image capturing element 122 is processed by an analog signal processing circuit 123 and then transmitted to a camera signal processing circuit 124. A microcomputer for controlling a camera system (hereinbelow, referred to as a camera control unit) 131 controls the entire image capturing apparatus. For example, the camera control unit 131 controls a shutter drive motor (not illustrated) to control the driving of the shutter 121.

A memory card 125 is a storage medium for storing data of a captured image and the like. The camera control unit 131 performs processing for storing data of a captured image in the memory card 125 based on a pressed state of a release switch 181 operated by a photographer.

An image display unit 171 includes a display device such as a liquid crystal display (LCD) panel. The image display unit 171 displays an image of the object that the photographer is trying to capture with the camera on a monitor and displays the captured image. A touch panel 172 is an operation unit used by the photographer to specify coordinates on the image display unit 171 with a finger or a touch pen, and can be integrated with the image display unit 171. For example, there is a built-in (in-cell) type device in which the touch panel 172 is configured so that light transmittance thereof does not interfere with display of the image display unit 171 and is incorporated inside a display surface of the image display unit 171. Input coordinates on the touch panel 172 are associated with display coordinates on the image display unit 171. Accordingly, a graphical user interface (GUI) can be configured as if a user can directly operate a screen displayed on the image display unit 171. An operation status of the touch panel 172 is managed by the camera control unit 131.

The main body unit 120 is provided with a mount contact unit 161, which is a communication terminal for communicating with the interchangeable lens 100, on a mounting surface with the interchangeable lens 100. On the other hand, the interchangeable lens 100 is provided with a mount contact unit 114, which is a communication terminal for communicating with the main body unit 120, on a mounting surface with the main body unit 120.

The lens control unit 111 and the camera control unit 131 can perform serial communication at predetermined timing via the mount contact units 114 and 161. Through the serial communication, the focus lens driving information, diaphragm driving information, and the like are transmitted from the camera control unit 131 to the lens control unit 111, and optical information such as a focal length is transmitted from the lens control unit 111 to the camera control unit 131.

The camera signal processing circuit 124 acquires a signal from the analog signal processing circuit 123 and performs signal processing. The camera signal processing circuit 124 includes a person detection unit 141 and a train detection unit 142. The person detection unit 141 detects a plurality of parts of a person from an image and outputs detected information. The person detection unit 141 is described in detail below with reference to FIG. 2. The train detection unit 142 detects a plurality of parts of a train from an image and outputs detected information. The train detection unit 142 is described in detail below with reference to FIG. 7. Detection results of the person detection unit 141 and the train detection unit 142 are transmitted to the camera control unit 131.

The camera control unit 131 includes a search area setting unit 150, a relevant area setting unit 151, a display frame setting unit 152, an AF target setting unit 153, and a focus detection unit 154. Each unit is realized by executing a program by a central processing unit (CPU) provided in the camera control unit 131.

The search area setting unit 150 sets a search area based on coordinates at which the fixed AF frame displayed on the image display unit 171 or the touch panel 172 is touched. An arbitrary area in an image can be set as a search area. The relevant area setting unit 151 sets a relevant area for each object included in the detection result acquired from the person detection unit 141 and the train detection unit 142.

The display frame setting unit 152 sets the image display unit 171 to display the fixed AF frame, the object detection frame, and information about the AF target area. The AF target setting unit 153 performs processing for notifying the focus detection unit 154 of the set area as the AF target area.

The focus detection unit 154 performs focus detection processing based on an image signal corresponding to a focusing target object notified by the AF target setting unit 153. The focus detection processing is performed using a phase difference detection method, a contrast detection method, or the like. In a case where the phase difference detection method is used, an image shift amount is calculated by correlation calculation on a pair of image signals having parallax. Processing for further converting the image shift amount to a defocus amount is performed. The defocus amount can be further converted to a focus lens driving amount in considering sensitivity of the interchangeable lens 100 in driving the lens. In a case where the contrast detection method is used, a focus position can be detected based on contrast evaluation information about the acquired image.

The camera control unit 131 transmits to the lens control unit 111 a focus detection result (the image shift amount or the defocus amount) acquired by the focus detection unit 154 or driving information such as the focus lens driving amount calculated based on the focus detection result. The focus lens control unit 113 controls the driving of the focus lens based on the focus lens driving information received from the camera control unit 131. In other words, the camera control unit 131 controls the driving of the focus lens via the focus lens control unit 113.

First, operations in a case where the person detection unit 141 detects a person are described.

FIG. 2 is a block diagram illustrating a configuration example of the person detection unit 141. The person detection unit 141 includes a head detection unit 201, an eye detection unit 202, and a torso detection unit 203.

The head detection unit 201 detects a head area of a person from a captured image. A known method can be used for detecting the head, such as a method based on a result of detecting a characteristic edge or pattern and a method based on an algorithm trained by machine learning of face areas.

The eye detection unit 202 detects an eye area from the captured image based on the head area output from the head detection unit 201. A known method can be used for detecting the eye, such as a method based on pattern matching and a method based on an algorithm trained by machine learning of eye areas.

The torso detection unit 203 detects a torso area from the captured image. The torso area is a rectangular area that includes a torso part of the human body below the neck and above the waist and does not include the arms. As with the head detection unit 201 and the eye detection unit 202, a known method, such as a method based on pattern matching and a method based on an algorithm trained by machine learning of torso areas can be used for detecting the torso.

Figure 4:
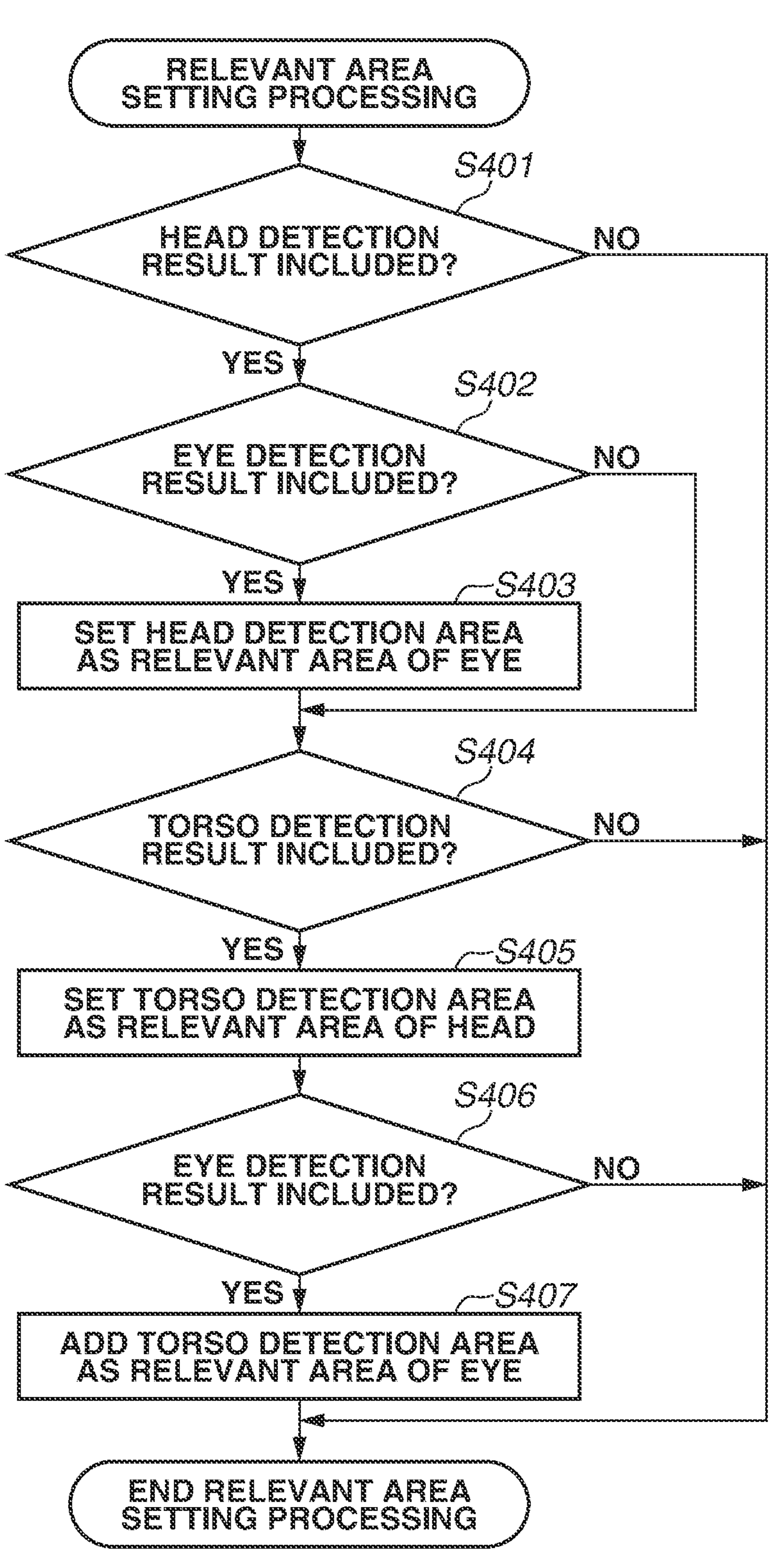
FIG. 4 is a flowchart illustrating relevant area setting processing in detecting a person.
Figure 5:
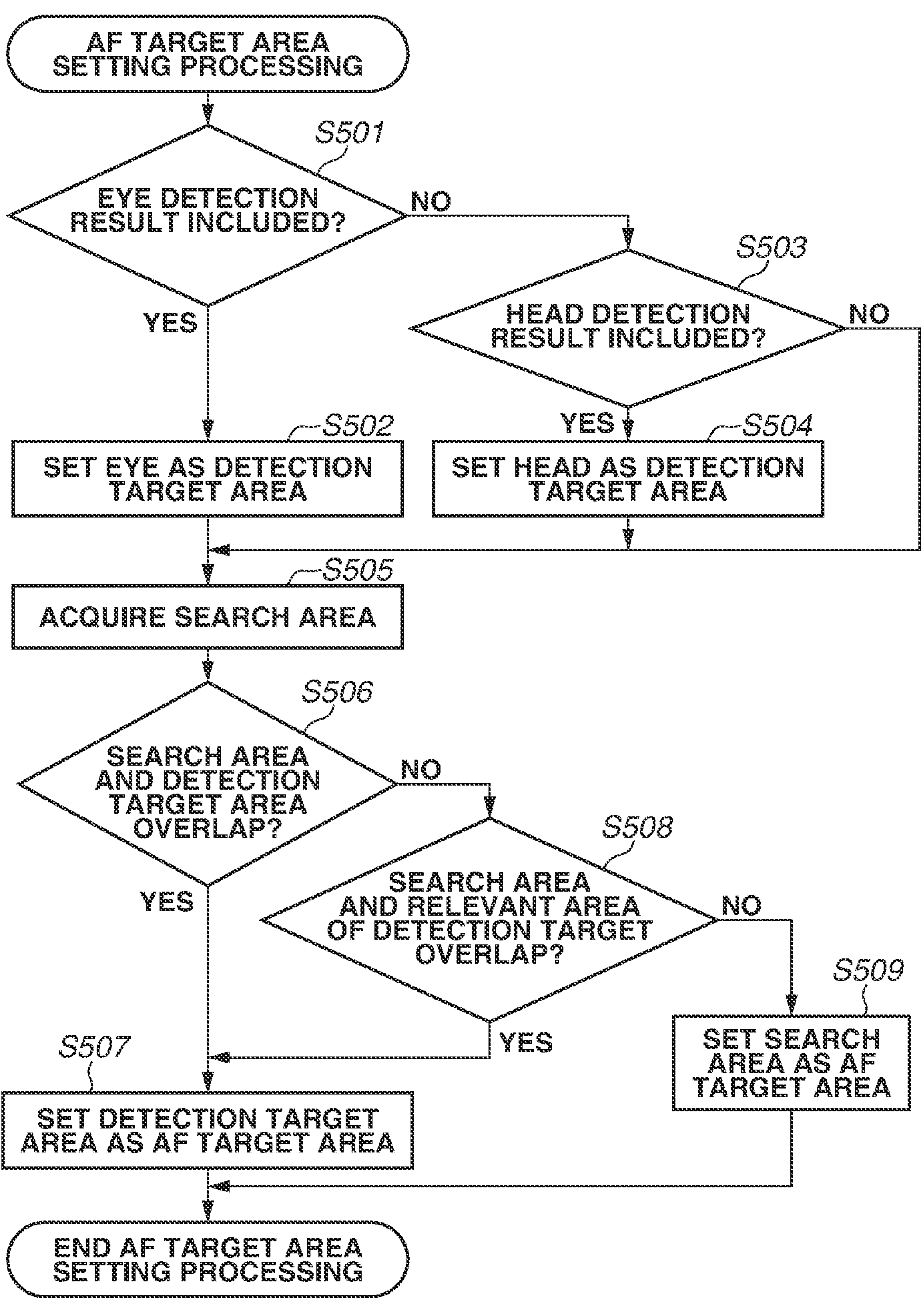
FIG. 5 is a flowchart illustrating automatic focus (AF) target area setting processing in detecting a person.

Operations from the object detection to AF target notification are described with reference to FIGS. 3 to 5.

Figure 3:
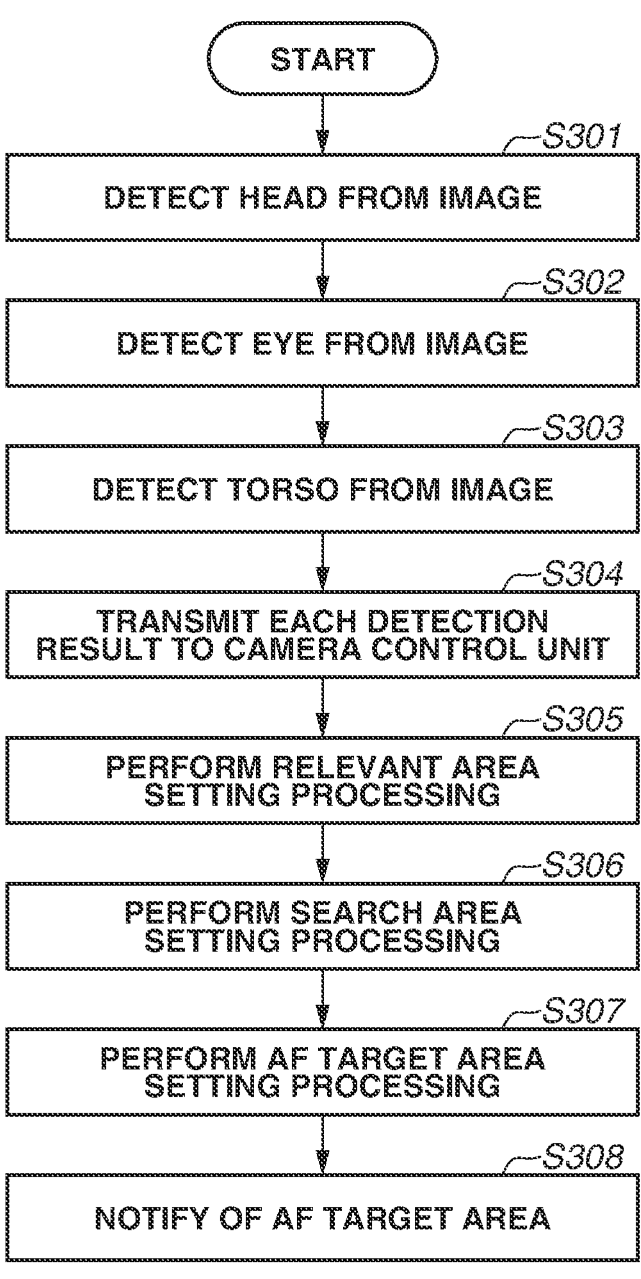
FIG. 3 is a flowchart illustrating operations in detecting a person.

FIG. 3 is a flowchart illustrating overall operations from when the person detection unit 141 detects a person to when the camera control unit 131 notifies a user of the AF target. FIG. 4 is a flowchart illustrating relevant area setting processing performed by the relevant area setting unit 151 in FIG. 3. FIG. 5 is a flowchart illustrating AF target area setting processing performed by the AF target setting unit 153 in FIG. 3.

In step S301 in FIG. 3, the head detection unit 201 detects the head from a captured image, and the processing proceeds to step S302. In step S302, the eye detection unit 202 detects the eye using the captured image and a head detection result acquired in step S301. At this time, in a case where there is no head detection result acquired in step S301, the eye detection is not performed, and the processing proceeds to step S303.

After step S302, in step S303, the torso detection unit 203 detects the torso from the captured image, and the processing proceeds to step S304. In step S304, the person detection unit 141 combines each detection result acquired in steps S301, S302, and 303 into a person detection result. Information about the person detection result is transmitted to the camera control unit 131. In a case where none of the detection results is acquired in the detection processing in steps S301, S302, and S303, empty information about the person detection result is transmitted to the camera control unit 131. After step S304, the processing proceeds to step S305.

In step S305, the relevant area setting unit 151 sets the relevant area for each detected object included in the person detection result. The relevant area setting processing is described in detail below. Next, in step S306, the search area setting unit 150 sets the search area based on the fixed AF frame displayed in the image display unit 171. A position and a range of the fixed AF frame are determined by a user's setting. The display frame setting unit 152 notifies the image display unit 171 of the fixed AF frame, and the image display unit 171 displays the captured image on which the fixed AF frame is superimposed.

In step S307, the AF target setting unit 153 sets the AF target area. The AF target area setting processing is described in detail below. Subsequently, in step S308, the display frame setting unit 152 notifies the image display unit 171 of AF target area information.

A processing content in step S305 (the relevant area setting processing) in FIG. 3 is described in detail with reference to FIG. 4.

In step S401, the relevant area setting unit 151 determines whether the person detection result includes the head detection result. In a case where the relevant area setting unit 151 determines that the person detection result includes the head detection result (YES in step S401), the processing proceeds to step S402, whereas in a case where the relevant area setting unit 151 determines that the person detection result does not include the head detection result (NO in step S401), the relevant area setting processing is terminated.

In step S402, the relevant area setting unit 151 determines whether the person detection result includes the eye detection result. In a case where the relevant area setting unit 151 determines that the person detection result includes the eye detection result (YES in step S402), the processing proceeds to step S403, whereas in a case where the relevant area setting unit 151 determines that the person detection result does not include the eye detection result (NO in step S402), the processing proceeds to step S404.

In step S403, the relevant area setting unit 151 sets a head detection area as the relevant area of the eye detection result and advances the processing to step S404. In step S404, the relevant area setting unit 151 determines whether the person detection result includes the torso detection result. In a case where the relevant area setting unit 151 determines that the person detection result includes the torso detection result (YES in step S404), the processing proceeds to step S405, whereas in a case where the relevant area setting unit 151 determines that the person detection result does not include the torso detection result (NO in step S404), the relevant area setting processing is terminated.

In step S405, the relevant area setting unit 151 sets a torso detection area as the relevant area of the head detection result and advances the processing to step S406. In step S406, the relevant area setting unit 151 determines whether the person detection result includes the eye detection result. In a case where the relevant area setting unit 151 determines that the person detection result includes the eye detection result (YES in step S406), the processing proceeds to step S407, whereas in a case where the relevant area setting unit 151 determines that the person detection result does not include the eye detection result (NO in step S406), the relevant area setting processing is terminated. Information indicating the determination result in step S402 may be stored by the person detection unit 141 and used in subsequent processing in step S406.

In step S407, the relevant area setting unit 151 adds the torso detection area to the relevant area of the eye and terminates the relevant area setting processing.

A processing content in step S307 (the AF target area setting processing) in FIG. 3 is described in detail with reference to FIG. 5. In step S501, the AF target setting unit 153 determines whether the person detection result includes the eye detection result. In a case where the AF target setting unit 153 determines that the person detection result includes the eye detection result (YES in step S501), the processing proceeds to step S502, whereas in a case where the AF target setting unit 153 determines that the person detection result does not include the eye detection result (NO in step S501), the processing proceeds to step S503.

In step S502, the AF target setting unit 153 sets the eye as a detection target area in the AF target area setting processing (hereinbelow, also simply referred to as a detection target area) and advances the processing to step S505. In step S503, the AF target setting unit 153 determines whether the person detection result includes the head detection result. In a case where the AF target setting unit 153 determines that the person detection result includes the head detection result (YES in step S503), the processing proceeds to step S504, whereas in a case where the AF target setting unit 153 determines that the person detection result does not include the head detection result (NO in step S503), the processing proceeds to step S505.

In step S504, the AF target setting unit 153 sets the head as the detection target area and advances the processing to step S505. In step S505, the AF target setting unit 153 acquires information about the search area set by the search area setting unit 150 in step S306 in FIG. 3.

In step S506, the AF target setting unit 153 determines whether the search area and the detection target area overlap. In a case where the AF target setting unit 153 determines that the search area and the detection target area overlap (YES in step S506), the processing proceeds to step S507, whereas in a case where the AF target setting unit 153 determines that the search area and the detection target area do not overlap (NO in step S506), the processing proceeds to step S508. However, in a case where the detection target area is not set in the processing so far, the AF target setting unit 153 determines that the search area and the detection target area do not overlap, and the processing proceeds to step S508.

In step S507, the AF target setting unit 153 sets the detection target area as the AF target area and terminates the AF target area setting processing. In step S508, the AF target setting unit 153 determines whether the search area and the relevant area of the detection target set as the detection target area overlap. In a case where the AF target setting unit 153 determines that the search area and the relevant area of the detection target overlap (YES in step S508), the processing proceeds to step S507, whereas in a case where the AF target setting unit 153 determines that the search area and the relevant area of the detection target do not overlap (NO in step S508), the processing proceeds to step S509. However, in a case where the detection target area is not set, or in a case where the relevant area is not set for the detection target in the processing so far, the AF target setting unit 153 determines that the search area and the relevant area of the detection target do not overlap, and the processing proceeds to step S509.

In step S509, the AF target setting unit 153 sets the search area as the AF target area and terminates the AF target area setting processing.

Figure 6A:
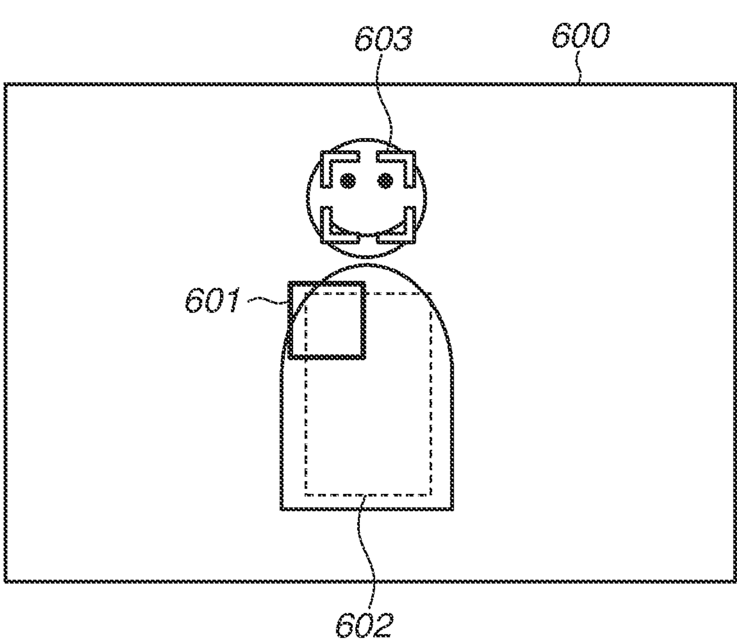
FIGS. 6A and 6B are schematic diagrams illustrating display screen examples in detecting a person.
Figure 6B:
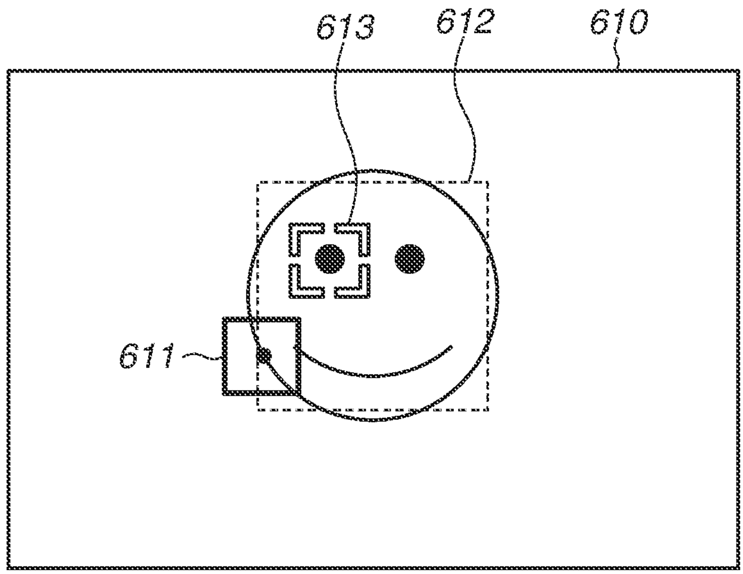

Display examples are described with reference to FIGS. 6A and 6B. FIG. 6A is a schematic diagram illustrating a display screen example 600 in a case where an image of an upper body of a person as an object is captured. FIG. 6B is a schematic diagram illustrating a display screen example 610 in a case where an image of the head of the person as the object is captured.

In FIG. 6A, a display frame 601 is a frame based on the search area of the object (such as an AF frame or a tracking frame). A torso detection area 602 of the object person is the relevant area relevant to a head detection area 603 of the object person. A dotted line indicates that the torso detection area 602 is a non-display area. The torso detection area 602 is set as the relevant area that does not include the head detection area 603. In this case, the display frame 601 and the head detection area 603 of the object person do not overlap on the screen. Thus, the processing proceeds from step S506 to step S508 in FIG. 5. The display frame 601 and the torso detection area 602 overlap on the screen, so that the processing proceeds from step S508 to step S507 in FIG. 5. The head detection area 603 is set as the AF target area, and a frame corresponding to the head detection area 603 is displayed on the screen.

In FIG. 6B, a display frame 611 is a frame based on the search area of the object (such as the AF frame or the tracking frame). A head detection area 612 of the object person is the relevant area relevant to an eye detection area 613 of the object person. A dotted line indicates that the head detection area 612 is a non-display area. In this case, the display frame 611 and the eye detection area 613 of the object person do not overlap on the screen. Thus, the processing proceeds from step S506 to step S508 in FIG. 5. The display frame 611 and the head detection area 612 overlap on the screen, so that the processing proceeds from step S508 to step S507 in FIG. 5. The eye detection area 613 is set as the AF target area, and a frame corresponding to the eye detection area 613 is displayed on the screen.

Next, operations in a case where the train detection unit 142 detects a train are described.

Figure 7:
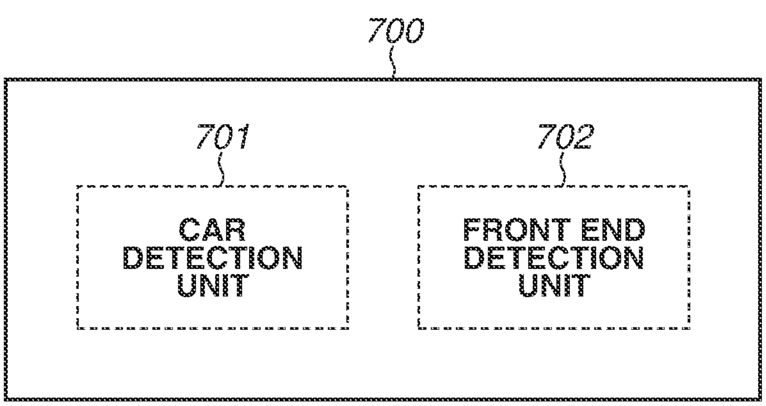
FIG. 7 is a block diagram illustrating a configuration of a train detection unit according to the present exemplary embodiment.

FIG. 7 is a block diagram illustrating a configuration example of a train detection unit 700. The train detection unit 700 includes a car detection unit 701 and a front end detection unit 702.

The car detection unit 701 detects a car area of a train from a captured image. A known method can be used for detecting the train, such as a method based on a result of detecting a characteristic edge or pattern and a method based on an algorithm trained by machine learning of car areas.

The front end detection unit 702 detects a front end area of the train from the captured image based on the car area output by the car detection unit 701. The front end area is a rectangular area that covers a front end of a leading car of the train. A known method can be used for detecting the front end, such as a method based on pattern matching and a method based on an algorithm trained by machine learning of front end areas.

Figure 8:
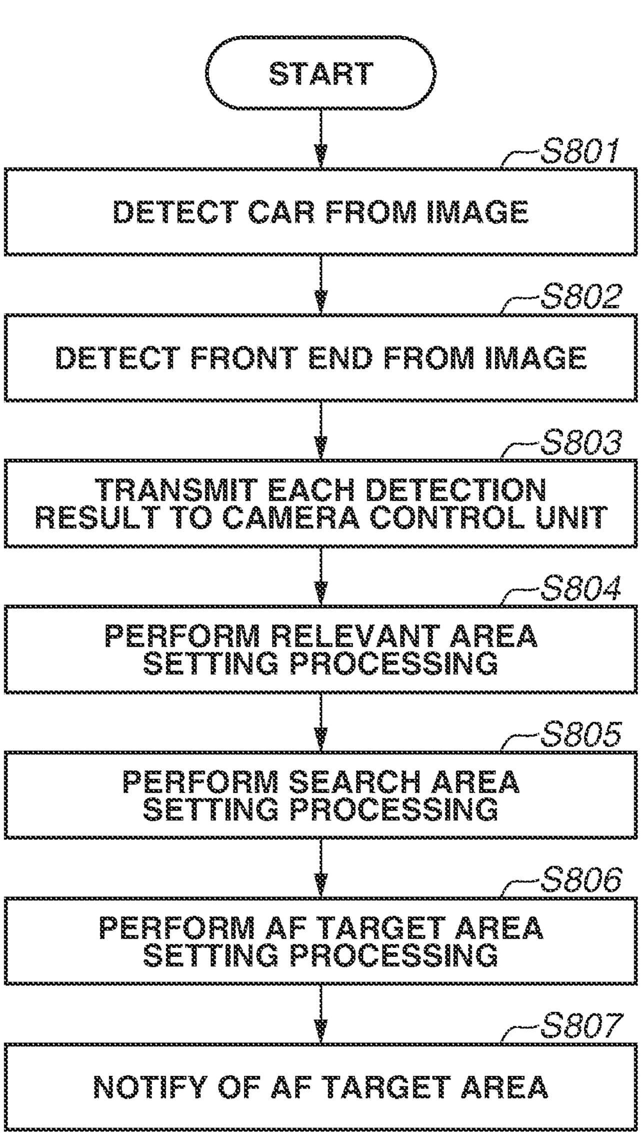
FIG. 8 is a flowchart illustrating operations in detecting a train.
Figure 9:
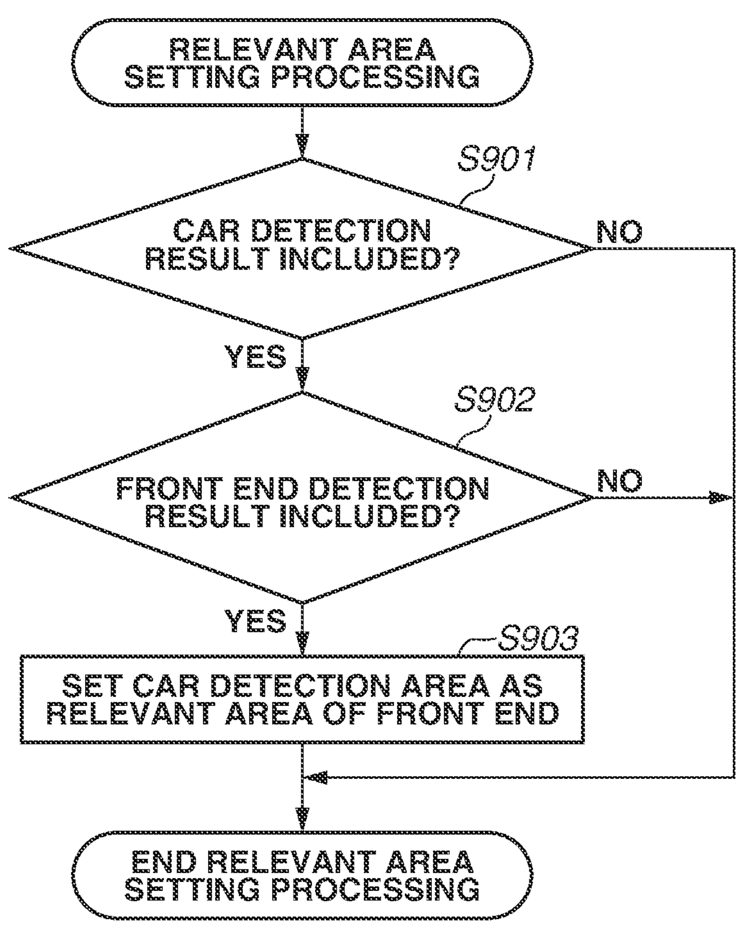
FIG. 9 is a flowchart illustrating relevant area setting processing in detecting a train.
Figure 10:
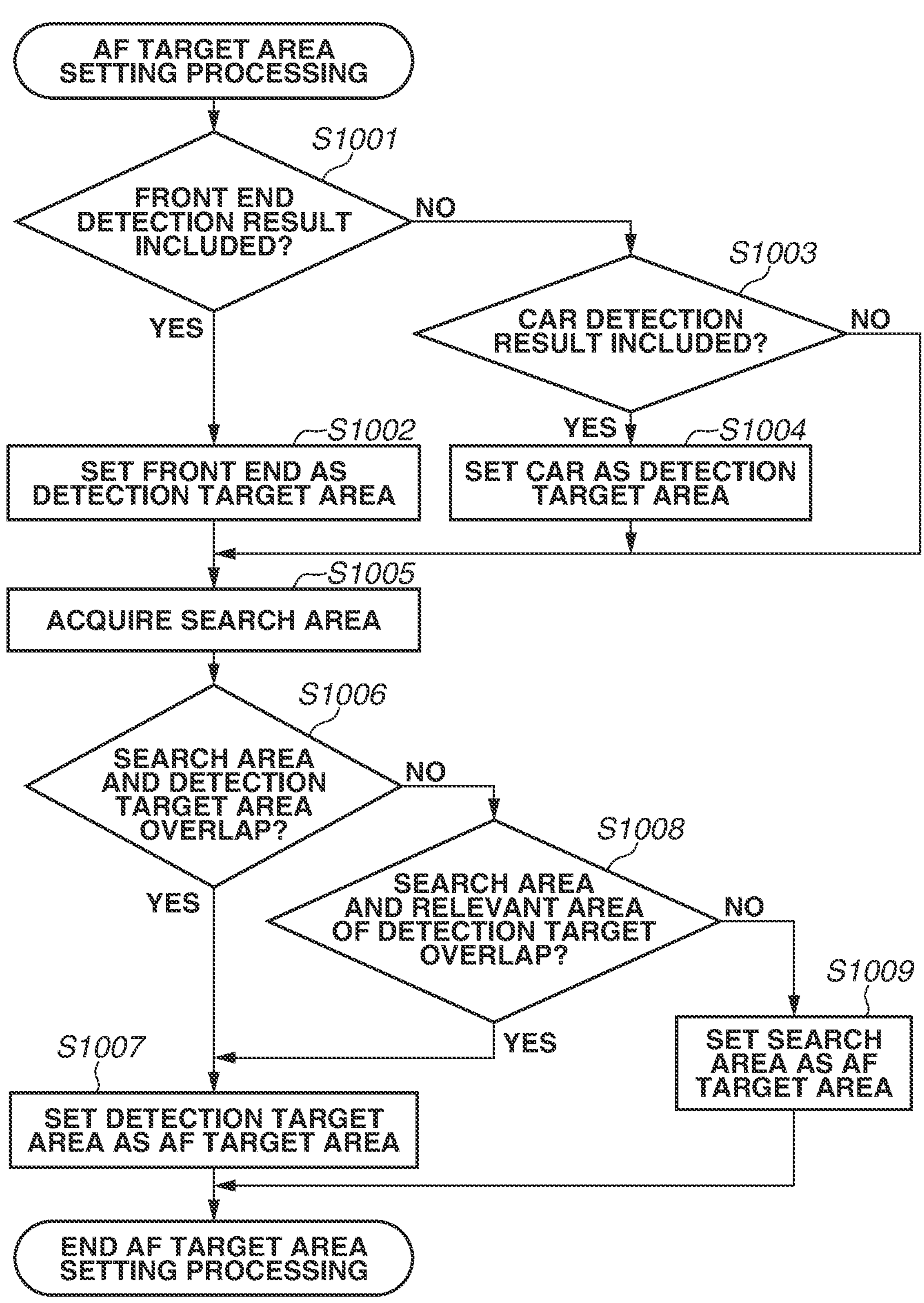
FIG. 10 is a flowchart illustrating AF target area setting processing in detecting a train.

Operations from the object detection to the AF target notification are described with reference to FIGS. 8 to 10. FIG. 8 is a flowchart illustrating overall operations from when the train detection unit 700 detects a train to when the camera control unit 131 notifies a user of the AF target. FIG. 9 is a flowchart illustrating the relevant area setting processing performed by the relevant area setting unit 151 in FIG. 8. FIG. 10 is a flowchart illustrating the AF target area setting processing performed by the AF target setting unit 153 in FIG. 8.

In step S801 in FIG. 8, the car detection unit 701 detects a car from a captured image, and the processing proceeds to step S802. In step S802, the front end detection unit 702 detects a front end using the captured image and a car detection result acquired in step S801. At this time, in a case where there is no car detection result acquired in step S801, the front end detection is not performed, and the processing proceeds to step S803.

In step S803, the car detection unit 701 combines each detection result acquired in steps S801 and S802 into the car detection result. Information about the car detection result is transmitted to the camera control unit 131. In a case where none of the detection results is acquired in the detection processing in steps S801 and S802, empty information about the train detection result is transmitted to the camera control unit 131. After step S803, the processing proceeds to step S804.

In step S804, the relevant area setting unit 151 sets the relevant area for each detected object included in the car detection result. The relevant area setting processing is described in detail below. Next, in step S805, the search area setting unit 150 sets the search area based on the fixed AF frame displayed in the image display unit 171. The position and the range of the fixed AF frame are determined by a user's setting. The display frame setting unit 152 notifies the image display unit 171 of the fixed AF frame, and the image display unit 171 displays the captured image on which the fixed AF frame is superimposed.

In step S806, the AF target setting unit 153 sets the AF target area. The AF target area setting processing is described in detail below. Subsequently, in step S807, the display frame setting unit 152 notifies the image display unit 171 of AF target area information.

A processing content in step S804 (the relevant area setting processing) in FIG. 8 is described in detail with reference to FIG. 9.

In step S901, the relevant area setting unit 151 determines whether the train detection result includes the car detection result. In a case where the relevant area setting unit 151 determines that the train detection result includes the car detection result (YES in step S901), the processing proceeds to step S902, whereas in a case where the relevant area setting unit 151 determines that the train detection result does not include the car detection result (NO in step S901), the relevant area setting processing is terminated.

In step S902, the relevant area setting unit 151 determines whether the car detection result includes the front end detection result. In a case where the relevant area setting unit 151 determines that the train detection result includes the front end detection result (YES in step S902), the processing proceeds to step S903, whereas in a case where the relevant area setting unit 151 determines that the train detection result does not include the front end detection result (NO in step S902), the relevant area setting processing is terminated.

In step S903, the relevant area setting unit 151 sets a car detection area as the relevant area of the front end detection result and terminates the relevant area setting processing.

A processing content in step S806 (the AF target area setting processing) in FIG. 8 is described in detail with reference to FIG. 10. In step S1001, the AF target setting unit 153 determines whether the train detection result includes the front end detection result. In a case where the AF target setting unit 153 determines that the train detection result includes the front end detection result (YES in step S1001), the processing proceeds to step S1002, whereas in a case where the AF target setting unit 153 determines that the train detection result does not include the front end detection result (NO in step S1001), the processing proceeds to step S1003.

In step S1002, the AF target setting unit 153 sets the front end as the detection target area and advances the processing to step S1005. In step S1003, the AF target setting unit 153 determines whether the train detection result includes the car detection result. In a case where the AF target setting unit 153 determines that the train detection result includes the car detection result (YES in step S1003), the processing proceeds to step S1004, whereas in a case where the AF target setting unit 153 determines that the train detection result does not include the car detection result (NO in step S1003), the processing proceeds to step S1005.

In step S1004, the AF target setting unit 153 sets the car as the detection target area and advances the processing to step S1005. In step S1005, the AF target setting unit 153 acquires information about the search area set by the search area setting unit 150 in step S805 in FIG. 8.

In step S1006, the AF target setting unit 153 determines whether the search area and the detection target area overlap. In a case where the AF target setting unit 153 determines that the search area and the detection target area overlap (YES in step S1006), the processing proceeds to step S1007, whereas in a case where the AF target setting unit 153 determines that the search area and the detection target area do not overlap (NO in step S1006), the processing proceeds to step S1008. However, in a case where the detection target area is not set in the processing so far, the AF target setting unit 153 determines that the search area and the detection target area do not overlap, and the processing proceeds to step S1008.

In step S1007, the AF target setting unit 153 sets the detection target area as the AF target area and terminates the AF target area setting processing. In step S1008, the AF target setting unit 153 determines whether the search area and the relevant area of the detection target set as the detection target area overlap. In a case where the AF target setting unit 153 determines that the search area and the relevant area of the detection target overlap (YES in step S1008), the processing proceeds to step S1007, whereas in a case where the AF target setting unit 153 determines that the search area and the relevant area of the detection target do not overlap (NO in step S1008), the processing proceeds to step S1009. However, in a case where the detection target area is not set, or in a case where the relevant area is not set for the detection target in the processing so far, the AF target setting unit 153 determines that the search area and the relevant area of the detection target do not overlap, and the processing proceeds to step S1009.

In step S1009, the AF target setting unit 153 sets the search area as the AF target area and terminates the AF target area setting processing.

According to a conventional technique, in a case where a part of the object is detected within the display frame, the detection target area cannot be selected as the AF target area unless the display frame and the detection target area overlap.

For example, even if a part of the object is captured within the fixed AF frame, the object is not set as the AF target unless the object detection frame is captured. In contrast, according to the present exemplary embodiment, a priority order (higher or lower order) is set for each part (including the entire part) of each object to be detected, and thus, in a case where an operation is performed to set one of the areas as the AF target area, the AF target area is set to the highest order part of the object detected at the time. Specifically, in a case where a part of the object is detected within the display frame, the detection target area can be selected as the AF target area in a case where the display frame and the relevant area of the detection target area overlap. In other words, it is possible to acquire the detection area of the object from the image, set the relevant area thereof, determine overlap between the search area and the detection area or the relevant area, and set the target area for processing. Thus, a user can easily specify a desired object.

According to the present exemplary embodiment, in a case where the detection target is the eye or the head of the person, the torso area is set as the relevant area and is used in the AF target area setting processing. In a case where the detection target is the front end of the train, the car area of the train is set as the relevant area and is used in the AF target area setting processing. In either case, the relevant area is wider than the detection target, and the movement of the object is gentle. Thus, a user holding the image capturing apparatus can easily capture the object within the area of the fixed AF frame.

Even if the object is a part that has a small detection area size and tends to move fast, such as the eye of the person or the front end of the train, the object can be selected as the AF target by moving the fixed AF frame closer to the relevant area. Accordingly, the present exemplary embodiment can take a measure to solve the issue that it becomes difficult for a user to select an intended object as the AF target. Further, because a part of the same detection target is set as the relevant area, an operation in a case where a user wants to set another area, which is not the detection target, as the AF target is not hindered.

In the processing based on algorithms described with reference to FIGS. 3 to 5 and FIGS. 8 to 10, operations until a user brings the fixed AF frame closer to the object and selects the AF target are performed.

In a subsequent operation, processing for determining the AF target by a user operation is further performed. In a case where the AF target is determined, the object to be the AF target is fixed (hereinbelow, the object of the fixed AF target is also referred to as the fixed AF target). The object other than the fixed AF target will not be selected as the AF target. The determination of the AF target is continued until the user cancels it or the image capturing apparatus loses sight of the object.

The AF target determination processing is started when a user presses the release switch 181 or performing a touch operation on the touch panel 172. The object fixed as the AF target differs depending on which method is used to start the AF target determination processing. For example, in the AF target determination processing by pressing the release switch 181, the AF target area set in advance is determined as the fixed AF target. On the other hand, in the AF target determination processing by the touch operation on the touch panel 172, the fixed AF target is determined based on coordinates specified by the touch operation. In a case where the coordinates specified by the touch operation are included in the detection target area or the relevant area of the detection target, the detection target area is determined as the fixed AF target area. In a case where the coordinates specified by the touch operation are not included in the detection target area or the relevant area of the detection target, an area with close saliency around the coordinates specified by the touch operation is determined as the fixed AF target area. The saliency is an index that indicates how close colors, luminance, and depths of pixels are to each other. The depth is information representing a depth direction of an image and can be acquired using a known method from information such as distribution of the image shift amount and the defocus amount of a plurality of images from different viewpoints, a distance image, and a distance map. As an exception, there is a case where the coordinates specified by the touch operation are within the person's torso area in a case where the detection target is the person's eye or face and the relevant area is the person's torso area. Only in this case, not the detection target area but the area with the close saliency around the touch position is determined as the fixed AF target area.

According to the above-described exemplary embodiment, a relevant area relevant to a detection target area of an object in a captured image is set, and in a case where a fixed AF frame area and the detection target area or the relevant area overlap, the detection target area can be set as an AF target area.

The exemplary embodiment according to the present disclosure is described in detail, but the present disclosure is not limited to the specific exemplary embodiment, and various forms without departing from the scope of the present disclosure can be included in the technical scope of the present disclosure.

According to the above-described exemplary embodiment, a detection target and a relevant area do not have to correspond one-to-one as described in the example in which two areas, the head area and the torso area, are set as the relevant areas for the eye area of the person. There may be a detection target without a relevant area, such as there is no relevant area for a person's torso or a train car.

According to the above-described exemplary embodiment, the example is described in which the detection result of the same person's body part is used as the relevant area for the detected object. The present disclosure is not limited to this example, and the detected object and the relevant area may be different types of objects. For example, it may be a person and an accessory. In a case where an object person wears an accessory and the like, and if the search area and the detection area for the accessory, which is the relevant area, overlap, the detection area corresponding to the object person can be set as the AF target area.

As in the above-described exemplary embodiment, using the detection result for setting the relevant area is an example, and the detection result may not be used. For example, an area in a fixed range in a certain positional relationship or an area acquired by calculating a range with similar color information or depth information with respect to the detection target area may be set as the relevant area. Alternatively, an area or the like acquired by an algorithm trained to calculate a relevant area of a detection target by machine learning can be set as the relevant area.

The present disclosure can also be realized by processing for supplying a program that implements one or more functions of the above-described exemplary embodiments to a system or an apparatus via a network or a storage medium, and reading and executing the program by one or more processors in a computer of the system or the apparatus. The present disclosure can also be realized by a circuit (for example, an application specific integrated circuit (ASIC)) for realizing one or more functions of the above-described exemplary embodiments.

According to an image processing apparatus of the present disclosure, it is possible to set a detection area of a desired object as a target area for processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-033442, filed Mar. 4, 2022, which is hereby incorporated by reference herein in its entirety.

What is claimed is:

1. An image processing apparatus configured to process a captured image, the image processing apparatus comprising:

at least one processor and memory storing instructions that, when executed, configure the at least one processor to function as:

a detection unit configured to detect a train from the captured image and to acquire first and second detection areas in the captured image, wherein the second detection area is within the first detected area and covers a front portion of the detected train included as part of the first detection area;

a relevant area setting unit configured to set the first detection area as a relevant area relevant to the second detection area;

a search area setting unit configured to set a search area related to the object in the image using a position of a fixed frame that is displayable on a display of an image capture apparatus that captured the image; and a target setting unit configured to set a target area in the image for processing, the target area being set by:

determining whether either the search area and the second detection area overlap or the search area and the relevant area overlap; and when it is determined that either the search area and the second detection area overlap or the search area and the relevant area overlap, setting the second detection area as the target area, and when it is determined that the search area does not overlap the second detection area and the search area does not overlap the relevant area, setting the search area as the target area.

2. The image processing apparatus according to claim 1, wherein the relevant area setting unit sets an area not including the second detection area as the relevant area, and wherein the target setting unit issues a notification of the set target area.

3. The image processing apparatus according to claim 1, wherein the first detection area is an area corresponding to a first part of an object, and wherein the second detection area is an area corresponding to a second part of the object.

4. The image processing apparatus according to claim 1, wherein the detection unit detects first and second objects, wherein the first detection area is an area corresponding to the first object, and wherein the second detection area is an area corresponding to the second object.

5. The image processing apparatus according to claim 2, wherein, in a case where a notification of the set target area is issued, the target setting unit does not issue a notification of the relevant area.

6. The image processing apparatus according to claim 1, further comprising a display to display a first frame corresponding to the search area and a second frame corresponding to the target area.

7. An image capturing apparatus comprising:

the image processing apparatus according to claim 1;

an image capturing unit configured to capture an image of an object via an imaging optical system; and a display unit configured to display a captured image.

8. The image capturing apparatus according to claim 7, wherein the target setting unit issues a notification of the determined target area as a target area for focus adjustment control of the imaging optical system using the display unit.

9. The image capturing apparatus according to claim 8, further comprising a specifying unit configured to specify an object in an image, wherein the target setting unit performs processing for determining whether a position in the image specified by the specifying unit is within the target area or the relevant area and determining the target area.

10. A control method to be executed by an image processing apparatus configured to process a captured image, the control method comprising:

detecting a train from the captured image and acquiring first and second detection areas in the captured image, wherein the second detection area is within the first detected area and covers a front portion of the detected train including as part of the first detection area;

setting the first detection area as a relevant area relevant to the second detection area;

setting a search area related to the object in the image using a position of a fixed frame that is displayable on a display of an image capture apparatus that captured the image; and setting a target area in the image for processing, the target area being set by:

determining whether either the search area and the second detection area overlap or the search area and the relevant area overlap; and when it is determined that either the search area and the second detection area overlap or the search area and the relevant area overlap, setting the second detection area as the target area, and when it is determined that the search area does not overlap the second detection area and the search area does not overlap the relevant area, setting the search area as the target area.

11. A non-transitory computer-readable storage medium storing instructions that, when executed by at least one processor, configures an image processing apparatus to execute a control method, the control method comprising:

detecting a train from the captured image and acquiring first and second detection areas in the captured image, wherein the second detection area is within the first detected area and covers a front portion of the detected train including as part of the first detection area;

setting the first detection area as a relevant area relevant to the second detection area;

setting a search area related to the object in the image using a position of a fixed frame that is displayable on a display of an image capture apparatus that captured the image; and setting a target area in the image for processing, the target area being set by:

determining whether either the search area and the second detection area overlap or the search area and the relevant area overlap; and when it is determined that either the search area and the second detection area overlap or the search area and the relevant area overlap, setting the second detection area as the target area, and when it is determined that the search area does not overlap the second detection area and the search area does not overlap the relevant area, setting the search area as the target area.

* * * * *